(12) United States Patent
Tawfik et al.

(10) Patent No.: US 7,144,648 B2
(45) Date of Patent: Dec. 5, 2006

(54) BIPOLAR PLATE

(75) Inventors: Hazem Tawfik, Islip Terrace, NY (US); Yue Hung, Farmingdale, NY (US)

(73) Assignees: The Research Foundation of State University of New York, Albany, NY (US); Long Island Power Authority, Uniondale, NY (US)

( * ) Notice: Subject to any disclaimer, the term of this patent is extended or adjusted under 35 U.S.C. 154(b) by 330 days.

(21) Appl. No.: 10/302,559

(22) Filed: Nov. 22, 2002

(65) Prior Publication Data

US 2004/0101738 A1    May 27, 2004

(51) Int. Cl.
  *H01M 2/14* (2006.01)
  *H01M 2/00* (2006.01)
  *B22F 7/00* (2006.01)
  *B05D 5/12* (2006.01)

(52) U.S. Cl. .................. 429/34; 429/38; 429/44; 429/30; 428/548; 427/115; 427/123

(58) Field of Classification Search .............. 429/34, 429/38, 44, 30; 428/548; 427/115, 123
See application file for complete search history.

(56) References Cited

U.S. PATENT DOCUMENTS

| | | | |
|---|---|---|---|
| 4,232,055 A | 11/1980 | Shaffer | |
| 4,937,152 A | 6/1990 | Sato et al. | |
| 5,527,363 A | 6/1996 | Wilkinson et al. | |
| 5,621,243 A | 4/1997 | Baba et al. | |
| 5,698,337 A | 12/1997 | Nitschke et al. | |
| 5,716,422 A | 2/1998 | Muffoletto et al. | |
| 5,998,522 A * | 12/1999 | Nakano et al. | ............. 524/315 |
| 6,040,075 A | 3/2000 | Adcock et al. | |
| 6,132,573 A | 10/2000 | Cubukcu et al. | |
| 6,309,521 B1 | 10/2001 | Andrews et al. | |
| 6,403,246 B1 | 6/2002 | Mizuno et al. | |
| 6,428,920 B1 | 8/2002 | Badding et al. | |
| 6,444,340 B1 | 9/2002 | Jaffrey | |
| 6,447,942 B1 | 9/2002 | Ovshinsky et al. | |
| 6,815,012 B1 * | 11/2004 | Baumann et al. | ............. 427/447 |
| 2002/0187379 A1 * | 12/2002 | Yasuo et al. | .................. 429/34 |
| 2003/0097846 A1 * | 5/2003 | Novotny et al. | ............... 62/3.7 |

FOREIGN PATENT DOCUMENTS

| | | |
|---|---|---|
| DE | 99/41795 | 8/1999 |
| DE | 199 37255 | 2/2001 |
| EP | 0780916 | 6/1997 |
| WO | 00/21152 | 4/2000 |
| WO | 01/71836 | 9/2001 |

* cited by examiner

*Primary Examiner*—Patrick Joseph Ryan
*Assistant Examiner*—Angela J. Martin
(74) *Attorney, Agent, or Firm*—Dilworth & Barrese LLP

(57) ABSTRACT

A bipolar plate has a multi-layered structure including an inner metallic layer and at least one outer metallic, corrosion-resistant layer splatted, embedded, diffused and interlocked into the inner metallic layer.

9 Claims, 3 Drawing Sheets

BIPOLAR PLATE

BACKGROUND

1. Technical Field

The invention relates to the art of electrochemical cells and more particularly, to a corrosion-resistant and durable metal bipolar plate capable of functioning in the highly corrosive fuel cell environment and a method of manufacturing the same.

2. Background of Related Art

Due to increasing demand in the earth's limited energy resources and low conversion efficiencies of conventional power generation systems as well as environmental concerns, the need for a clean, reliable, and renewable source of energy has greatly escalated. Fuel cells are one of the most promising techniques to meet this need.

In a fuel cell, the chemical energy is provided by a fuel, such as hydrogen, and an oxidant, such as oxygen, stored outside the fuel cell. Functionally, a fuel cell has two electrodes flanking an electrolyte. Oxygen passes over one electrode and hydrogen over the other, generating electricity, water and heat.

Among numerous types of fuel cells, a proton exchange membrane cell (PEM) type is known for operating at relatively low temperatures (about 200° F.), as well as for having high power density and varying their output quickly to meet shifts in power demands. All of the above-mentioned characteristics are found particularly attractive to automobile industry, where PEMs have been declared "the primary candidate for high-duty vehicles."

The heart of the fuel cell, including the PEM fuel cell, is a thin, solid polymer membrane-electrolyte having an anode on one face of the membrane-electrolyte, whereas the other face thereof is provided with the cathode. The membrane is sandwiched between a pair of electrically conductive contact elements which serve as a current collectors configured to deliver and distribute the fuel cell's gaseous reactants ($H_2$ and $O_2$/air) over the surfaces of the respective anode and cathode.

A bipolar PEM fuel cell comprises a plurality of the membrane-electrode-assemblies stacked together in the electrical series while being separated one from one another by an impermeable, electrically conductive contact element known as a bipolar plate. The opposite faces of the bipolar plate are juxtaposed with the anode of one cell and the cathode of the other cell, respectively. Accordingly, the bipolar plate separates adjacent cells and electrically conducts current therebetween. Furthermore, the bipolar plates give rigidity to the PEM fuel cell stack and support the membranes. In addition, the various flow channels for air, fuel and coolant are typically incorporated into the bipolar plates.

In a working PEM environment, the bipolar plates are in constant contact with highly acidic solutions. Moreover, the cathode operates in.a highly oxidizing environment while being exposed to pressurized air. Also, the anode is constantly exposed to super atmospheric hydrogen and an acidic environment as well. Hence, bipolar plates must be resistant to acids, oxidation, hydrogen and brittleness. Otherwise, the bipolar plates are affected by corrosion, which is detrimental to the performance of fuel cell as it fouls the catalyst of the electrode in the membrane electrode assembly and steadily degrades the cell's power output.

Graphite is currently the most popular bipolar material for fuel cell applications because of its non-corrosive property. However, graphite is brittle and porous making it extremely difficult to machine and assemble bipolar plates during the production process. Still another consequence stemming from the inherent characteristics of graphite is that it is a poor load-support structure. Note that for the operation of the fuel cell, it is necessary to generate two perfectly sealed chambers, one for oxygen and the other for hydrogen. Since high loads are detrimental to structural integrity of graphite, a fuel cell stack often leaks externally because of the lack of sufficient forces capable of reliably sealing adjacent bipolar graphite plates. In addition, the fuel cell stack leaks internally as a result of the porosity of graphite. To combat this problem, the surfaces of the graphite bipolar plates are covered by a sealant, which, unfortunately, decreases the electrical conductivity of the graphite surfaces and, thus, increases the heat loss. Both types of leakage represent a safety hazard (hydrogen is extremely explosive) and may jeopardize the operation of the fuel cell. Finally, graphite is relatively expensive.

As an obvious alternative to graphite, lightweight metals such as aluminum and titanium and their alloys have been proposed. While metals are non-porous, highly electro-conductive, inexpensive, durable and have low density, their use in the PEM environment is limited because of their low resistance to corrosion.

Covering metal substrates with polymeric material increases electrical resistance of the bipolar plates. Hence, electrical conductivity of the bipolar plate at the very least decreases and, in some cases, may be dramatically reduced.

It is, therefore, desirable to produce reliable and efficient metal-based bipolar plates capable of exhibiting high resistance to corrosion in an acidic environment.

SUMMARY OF THE INVENTION

A bipolar plate made from a metal substrate and having at least one corrosion-resistant metallic layer attains this objective. In accordance with one aspect of the invention, a metallic powder directed towards the substrate at high velocities forms the corrosion-resistant layer. In practice, the powdered metallic particles possessing great kinetic energy splat across and embed into the metal substrate at a depth. As a result, the metal substrate and powdered particles interlock and form the corrosion-resistant layer.

In accordance with another aspect of the invention, the above-disclosed inventive concept has been implemented by the use of a thermal spray technique allowing the metallic particles to possess the necessary kinetic energy for the particles to impregnate and interlock with the metal substrate within the boundary region. Accordingly, the thermal spray technique provides a base metal forming the substrate comprising an anti-corrosion layer. In other words, the thermal spray technique improves the anti-corrosion properties of a base metal.

In accordance with one sub-aspect of the invention, the thermal-spray technique utilized for providing a corrosion-resistant metallic layer includes any method providing a particle stream with high velocities. These methods include plasma coating, detonation, diamond jet and high velocity oxygen fuel (HVOF) technologies, which are all associated with elevated temperatures and high velocities. Note, that the thermal spray techniques differ from one another by respective temperatures and velocities. For example, the plasma technology utilizes highly elevated temperatures, whereas, the HVOF is known for relatively low temperatures slightly exceeding the melting temperatures of the metallic particles and very high velocities. Still another promising technique associated with extremely high velocities and low temperatures is a cold gas dynamic technology characterized by high velocities and low temperatures.

The high-velocity oxygen fuel (HVOF) technology has been found highly efficient within the context of this invention and, as known, uses oxygen and a fuel (liquid or gaseous) to produce a high velocity gas stream. Entrained in the gas stream is a line of nitrogen carrying metallic powder that impacts upon the metal substrate. As a result of the impingement of the particles against the metal substrate at high velocities, the metallic powder splats, embeds and impregnates a boundary region of the metal substrate. Hence, a multi-layered all metallic structure of the bipolar plate has a highly dense corrosion-resistant metallic layer. In addition to the thermal spray technology, a vapor-deposition technology can be utilized as well. The disadvantage of the latter is its relatively slow-rate of deposition.

According to a further aspect of the invention, the metallic powder impacted into the metallic substrate preferably includes nickel-based, chrome-based and/or carbide-based alloys. In a preferred embodiment, these alloys are mixed.

In a further aspect of the invention, because the thermal spray technique is associated with a significant temperature gradient across the bipolar plate to be treated, the latter tends to deform. Even assuming that the opposite faces of the bipolar plate have the same thermal expansion coefficient, the sprayed-upon face still would expand more than the opposing face. Since the principle of operation of the thermal spray technology is a combination of diffusion, interlocking and embedment resulting from of the high impinging forces of the heated particles, the plates tend to deform as a result of a temperature differential between the treated side and the opposing non-treated side of the bipolar plate. Accordingly, repeated deformation of the bipolar plate leads to eventual cracking of the corrosion-resistant layer and other physical consequences detrimentally affecting the bipolar plate.

To minimize a temperature gradient, the invention provides for a few alternatives. One alternative is to increase the thickness of the bipolar plate. The downside of this seemingly easy solution is an increased volume, cost and weight of a fuel cell typically comprised of many bipolar plates.

Still another inventive solution to the deformation problem is to heat the side opposite to the side exposed to the thermal spray during the process of forming the corrosion-resistant metallic layer to minimize the temperature differential.

Yet a further embodiment of the inventive method includes cooling the gas jet stream impacting upon the substrate of the bipolar plates. In additional to different techniques directed to simultaneously heating the opposite sides of the bipolar plate during applying a metallic corrosion resistant layer, the cold gas dynamic coating is an effective alternative solution to the thermal technologies.

A further aspect of the invention relates to the metallic bipolar plate featuring a new design of fuel and oxidant channels, which are specifically configured to be effectively covered by the top non-corrosive metallic layer applied in accordance with the inventive method.

OBJECTS OF THE INVENTION

It is, therefore, a principle object of the invention to provide a cost-effective and corrosion-resistant metal bipolar plate;

Another object of the invention is to provide a highly conductive and anticorrosion multi-layered metallic bipolar plate characterized by improved resistance to mechanical and thermal stresses;

A further object of the invention is to provide a robust structure of the multi-layered metallic bipolar plate capable of withstanding increased loads;

Still another object of the invention is to provide a method for manufacturing the multi-layered metallic bipolar plate having increased anti-corrosion characteristics; and Yet a further object of the invention is to provide a cost-efficient mass-production method for manufacturing the bipolar plates directed to minimize their deformation during application of the corrosion-resistant metallic layer to the surface of the metallic substrate.

BRIEF DESCRIPTION OF THE DRAWINGS

The above and other objects, advantages and features will become more readily apparent from the description of the preferred embodiment accompanied by the following drawings, in which.

SPECIFIC DESCRIPTION

Figure 1:
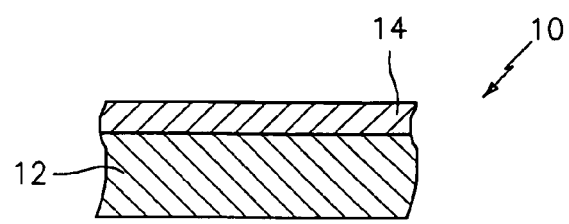
FIG. 1 is a cross-sectional view of the inventive multi-layered metallic bipolar plate.
Figure 4:
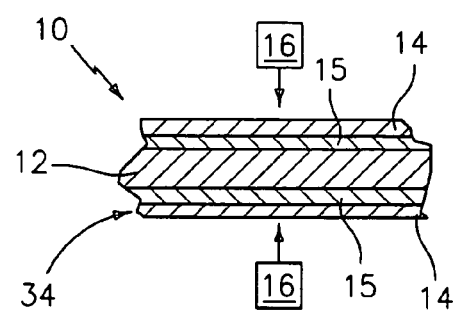
FIG. 4 is an illustration of the preferred embodiment of the inventive method of producing the inventive bipolar plates by the HVOF.

Referring to FIG. 1, a bipolar plate 10 manufactured in accordance with the invention is configured of a metal substrate 12 and a metallic corrosion-resistant layer 14 deposited atop the metal substrate 12. To produce the inventive bipolar plate 10, metallic powder having corrosion-resistant characteristics impinges upon a face of the substrate 12 at high velocities and, as a result, splats, embeds and interlocks the metallic substrate within its boundary region 15, as shown in FIG. 4, to form the corrosion-resistant layer 14. Thus, the inventive bipolar plate 10 is an all-metallic structure including the metal substrate 12 and the corrosion resistant layer 14 formed in the boundary region or interface 15, in which the impinged particles have penetrated and bonded with the substrate.

Figure 2:
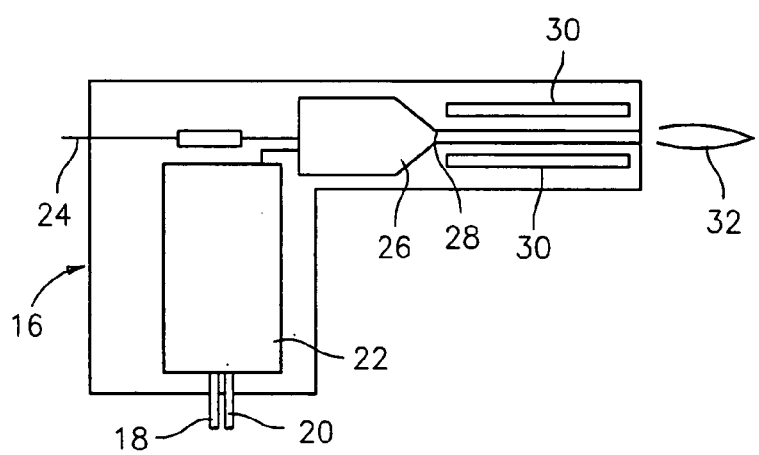
FIG. 2 is a schematic view of an HVOF process adapted to produce the inventive bipolar plates.

The inventive structure of the bipolar plate 10 has been produced by a thermal spray technique or cold gas dynamic technique including a group of processes which predominantly employ jets of powdered metallic particles flowing at high velocities to impinge against the surface of the substrate material. Particularly, the high velocity oxygen fuel (HVOF) method has been successfully applied to produce the inventive bipolar plates 10. A rather typical structure implementing this method is shown in FIG. 2. The device includes a gun 16 in which a fuel 20 (kerosene, acetylene, propylene and hydrogen) and oxygen 18 are supplied into a combustion chamber 22 producing a hot high pressure flame which is forced with an increasing speed along a nozzle 26. Powder 24 is fed axially into the supersonic nozzle 26 under high pressure, and a high velocity jet stream 32 carrying powdered particles exits the outlet port 28 of the nozzle 26 to impinge against the boundary region of the substrate 12 (FIG. 1). A cooling medium traversing conduits 30 lowers the temperature of the material of the gun 16.

The very high kinetic energy of particles striking the surface of the substrate 12 allows the particles to splat, embed and interlock within a boundary region 15 of the metallic substrate 12 during the formation of a thin layer 14, which, in the context of the invention, is metallic and anti-corrosive (See FIG. 4). As a result of the HVOF process, the temperature of the metallic particles is slightly above their melting temperatures and thus the substrate material is minimally metallurgically affected.

The substrate 12 can be selected from all electrical conductive metals including, but not limited to, stainless steel, aluminum and aluminum alloys, zinc and its alloys, magnesium and magnesium alloys and titanium and titanium alloys. Advantageously, however, the substrate 12 of the bipolar plate 10 includes aluminum characterized by low electrical resistance and, thus, high electrical conductivity.

The corrosion resistant layer 14 is selected from nickel-based alloys, such as Superalloy (Inconnel 625), and/or carbide-based alloys that include, but not limited to, Tungsten Carbide, and Chrome Carbide. Excellent results have been achieved by utilizing a mixture of Nickel, Chrome and Carbide alloys, in which Carbide alloys preferably constitute a relatively major part.

A combination of the corrosion-resistant layer 14 and the boundary region 15 provides the surface of the bipolar plate 10 with low porosity. In fact, the bipolar plate 10 has only 1% possibility of voids or porosity in the boundary region 15. Accordingly, the surface of the bipolar plate 10 may require a slight amount of sealant, which in this case would lead to an insignificant increase of the electrical conductivity of the bipolar plates. Since the principle of forming the metallic, multi-layered bipolar plate 10 is diffusion and melting, the particles impacting into a face of the substrate 12 can be cooled to temperatures minimizing the thermal gradient between the plate's opposite faces. Any suitable means for cooling may be utilized within the context of this invention, including, for example, cooling medium carrying conduits within a device used for forming a corrosion-resistant layer 14, e.g., as shown in FIG. 2. Accordingly, the overall deformation of the bipolar plate 10 is minimized.

Thus, the corrosion-resistant layer 14 and the substrate 12 are intimately bonded within the boundary region or interface 15 characterized by high density, high tensile and sheer bonding strength. The temperature, velocity and resulting residual stress field associated with the HOVF allow the corrosion-resistant layers 14 to be about 0.008–0.010 inches. Since the thickness of the layer 14 is insignificant, its contribution to a slight increase in the bipolar plate's 10 electrical resistance is minimal and can be ignored. Thus, the inventive bipolar plate 10 has a multi-layered all metallic structure characterized by a dense, corrosion-resistant surface radically minimizing the deterioration of the bipolar plate 10 from oxidation.

Figure 3:
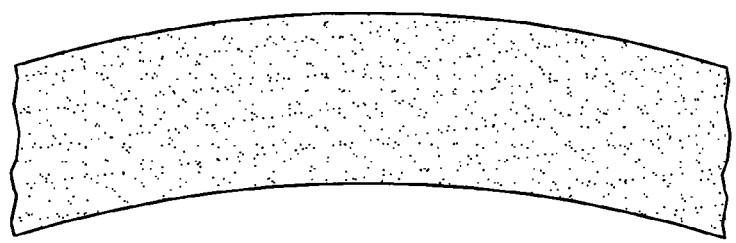
FIG. 3 is a side view of the bipolar plate produced in accordance with the invention after it has been treated by a HVOF thermal spray system.

However, even the reduced temperatures associated with the inventive method cannot completely eliminate metal deformation due to the still significant gradient across the bipolar plate 10, as shown in FIG. 3. Repeated deformations of the plate 10 in opposite directions resulting from thermal coating of the opposites sides could be an additional cause of cracking of the corrosion-resistant layer and of gas leakage, particularly hydrogen, when the plates are stacked together to produce a power stack. Moreover, excessive distortion of the bipolar plates will cause poor contacts between the components of the fuel cell including electrodes, diffusion corrosion-resistant layers 14, the substrates 12, membranes and gaskets. This, in turn, increases electrical resistance and causes the dissipation and waste of the electrical energy as heat.

In accordance with the invention, this drawback is remedied in an effective and simple manner. As illustrated in FIG. 4, opposite faces of the substrate 12 are simultaneously thermally treated to provide for opposite corrosion resistant layers 14. Accordingly, the thermal gradient across the bipolar plate 10 is reduced, and hence, the deformation of the bipolar plate 10 is farther minimized.

In accordance with one embodiment, a face of the substrate 12 is juxtaposed with a heated component heating the substrate 12 by convection. Any source of heat including a hot or heated plate can be used as the heated component for thennally treating a side of the substrate 12 which is opposite to the side of the substrate 12 being impinged by the particles. Preferably, however, two HVOF guns 16 are used simultaneously to treat the opposite faces of the substrata 12. By using the guns 16 simultaneously to treat the opposing faces of the substrate 12, a heated boundary region 34 is formed due to the penetration of the high-velocity particles into the substrate 12, as shown in FIG. 4. In mass production, the use of two guns 16 results in a cost-efficient process of producing the inventive bipolar plates 10.

Alternatively to the thermal spray technique, the inventive subject matter includes a cold gas dynamic technique associated with low temperatures and high velocities. Hence, the bipolar plates treated by this technique do not tend to deform and thus do not require additional cooling techniques as discussed above.

Figure 6A:
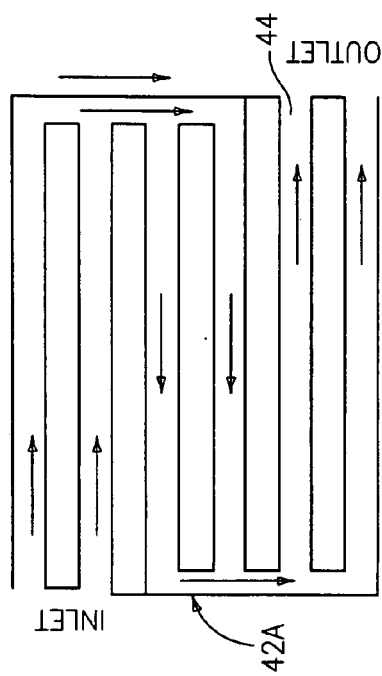
FIGS. 6A and 6B are schematic view of different serpentine designs.
Figure 6B:
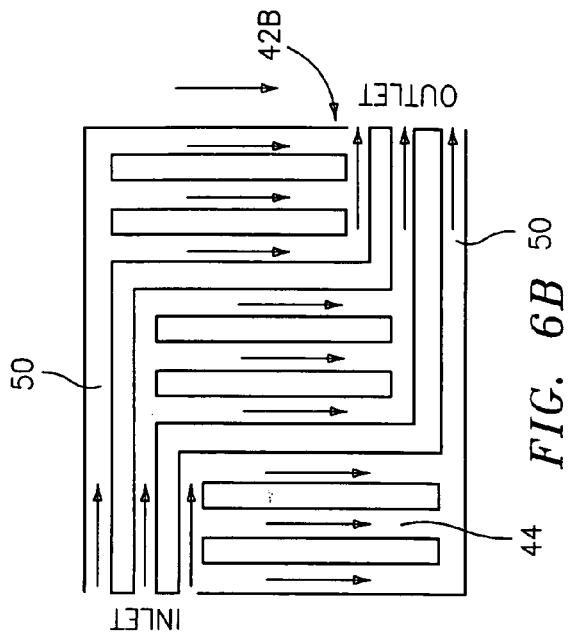
Figure 5:
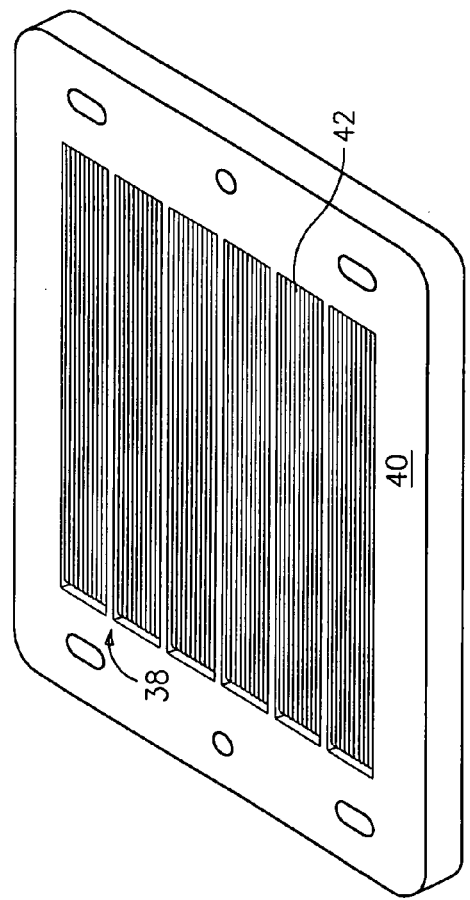
FIG. 5 is an isometric view of the inventive bipolar plate.
Figure 7:
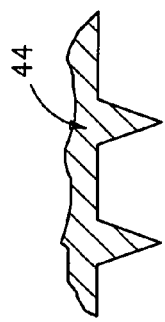
FIG. 7 is a cross-section of flow conveying channels.

The inventive bipolar plate 10, as shown in FIG. 5, includes a peripheral region 40 and a centrally located active region 38. The process of producing the bipolar plate 10 begins with machining a serpentine design 42 including a plurality of gas-conveying channels 44 within the central region 38 on opposite faces of the bipolar plate, as better seen in FIGS. 6A, 6B and 7. In accordance with the invention, as shown in FIG. 7, the chazmels 44 each have a V-shaped cross section facilitating the application of the uniform corrosion resistant layer 14. Still another advantage of the V-shaped channel in the context of the invention is to reduce the number of spray passes necessary to treat the entire surface of the central region 38 of the bipolar plate 10. Accordingly, this feature of the invention renders the production process of the bipolar plates 10 even more cost-efficient.

As known, water is generated in the oxygen side of a binolar during the reaction of the reactant gases as a byproduct. Improper water management will decrease the power output of the fuel cell, or it could eventually stop the electro-chemical operation of the fuel cell because of the possibility of water flooding the oxygen side of the bipolar plate. To minimize such a possibility, the vertical channels 44 are formed in the oxygen side of the bipolar plate 10. More particularly, the vertical channels 44 are pointed downward and extended between horizontally provided conduits 50 so that water is drained by gravity, as shown in FIG. 6B. The hydrogen side, as shown in FIG. 6A, is provided with gas conveying channels 44 arranged in a horizontal zigzag configuration.

Figure 8:
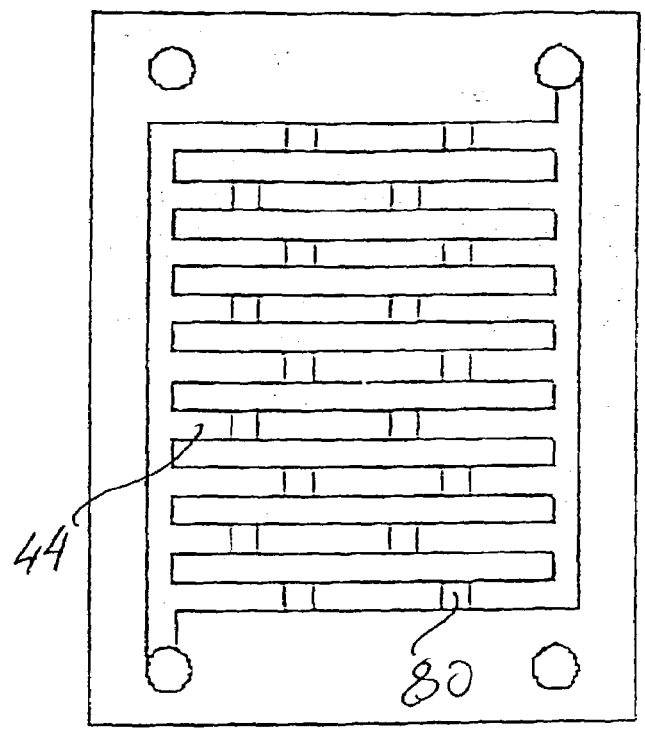
FIG. 8 is an elevated view of the bipolar plate of FIG. 3 provided with a plurality of flow obstructions.
Figure 9:
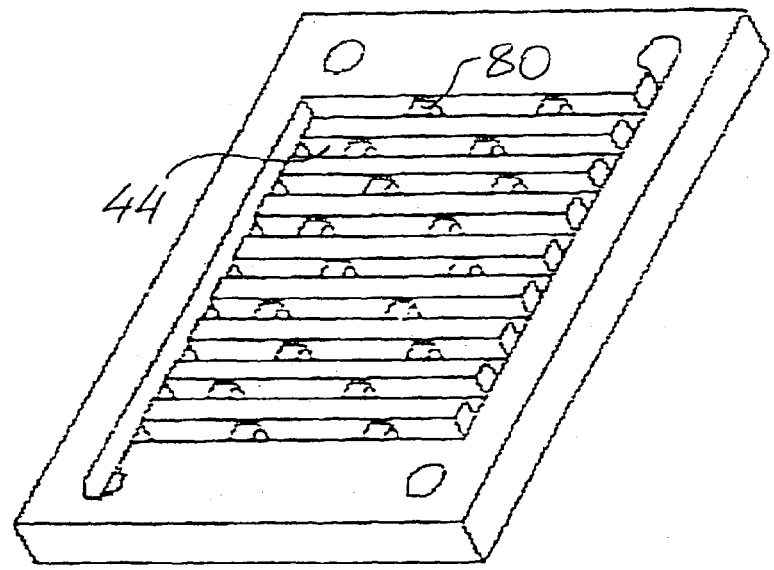
FIG. 9 is an isometric view of the bipolar plate shown in FIG. 8.

To enhance the reaction between the reactant gases in a membrane juxtaposed with opposing sides of the adjacent bipolar plates, as known, each gas conveying channel or conduit 44 (FIGS. 8, 9) configured for conveying hydrogen and oxygen, respectively, have projections or bosses 80. Flow obstruction provided by the projections 80, which redirect gas flow towards the membrane, enhances the reaction of the reactant gases. A number and particular shape of the obstructions 80, which can fully or partially block the flow, are subject to given conditions. As a result, the power density output of the fuel cell pack is greatly improved as a result of enhanced interaction between the reactant gases and reactant electrode assemblies.

Thus, the bipolar plate 10 of the present in invention as shown in FIG. 1 is made of highly conductive metals. More specifically, the bipolar plate of the present invention has minimal electrical resistance and weight. Furthermore, a manufacturing process for producing the bipolar plate of the present invention is cost-efficient. Due to the highly accelerated powdered particles splatted, imbedded and interlocked in the substrate 12, the inventive bipolar plate 10 has a multi-layered structure characterized by a strong bond between the substrate 12 and the metallic layer 14. Furthermore, because the metallic layer 14 is selected from nickel- and carbide- based metallic alloys exhibiting high corrosion resistance, the bipolar plate 10 of the invention enjoys a long and productive life while having all the benefits associated with metals in the context of the fuel cells, as discussed above.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A method of producing a metallic bipolar plate comprising the steps of:
    providing a plurality of metallic particles with high kinetic energy, the metallic particles being selected from metals or metal alloys exhibiting anti-corrosion characteristics;
    impinging the highly energized metallic particles against a metal substrate at high velocities, thereby flattening, embedding, diffusing, and interlocking the metallic particles with the metal substrate in a boundary region thereof, thereby forming a metallic corrosion-resistant layer within the boundary region of the metal substrate; and
    reducing a temperature gradient by simultaneously forming the metallic corrosion-resistant layer within boundary regions on opposite faces of the metallic substrates, thereby forming corrosion-resistant metallic boundary regions.

2. The method of claim 1, wherein the corrosion-resistant metallic boundary layer is formed using a thermal spray technique or a cold gas dynamic technique.

3. The method of claim 1, wherein the metallic particles are selected from the group consisting of nickel-based alloys, carbide-based alloys and a combination thereof.

4. The method of claim 3, wherein the combination of the nickel-based alloys and carbide-based alloys are predominantly carbide-based alloys.

5. The method of claim 1, wherein the corrosion-resistant metallic layer is about 0.008–0.010 inch thick.

6. The method of claim 1, further comprising forming a plurality gas conveying channels within the corrosion-resistant metallic boundary regions of the metallic substrate.

7. The method of claim 6, wherein the gas conveying channels each have a V-shaped cross-section, the method further comprising the steps of arranging the gas conveying channels on a first face to guide oxygen in a vertical direction, thereby evacuating water from one of the corrosion-resistant metallic boundary regions under gravity, and arranging the gas conveying channels on the opposite face to guide hydrogen in a horizontal zig-zag configuration, and providing projections in each of the gas conveying channels.

8. The method of claim 1, wherein the metal substrate is a metal having a low electrical resistance selected from the group consisting of aluminum, cast iron, steel, aluminum alloys, zinc, magnesium, magnesium alloys and a combination of these.

9. The method of claim 1, wherein the step of simultaneously forming the metallic corrosion-resistant layer within the boundary regions on the opposite faces of the metallic substrate prevents deformation of the bipolar plate.

* * * * *